US009694625B2

(12) United States Patent
Hernandez Perdomo et al.

(10) Patent No.: US 9,694,625 B2
(45) Date of Patent: Jul. 4, 2017

(54) DEVICE FOR MAINTAINING THE ORIENTATION OF AN EMBLEM IN AN AUTOMOBILE WHEEL

(75) Inventors: Wilmar Hernandez Perdomo, Parets del Valles (ES); Augusto Mayer Pujadas, Parets del Valles (ES); Jose Sanahuja Clot, Parets del Valles (ES); Eduardo Fernandez Sanchez, Parets del Valles (ES)

(73) Assignee: Zanini Auto Grup, S.A., Barcelona (ES)

( * ) Notice: Subject to any disclaimer, the term of this patent is extended or adjusted under 35 U.S.C. 154(b) by 65 days.

(21) Appl. No.: 14/415,291

(22) PCT Filed: Jul. 19, 2012

(86) PCT No.: PCT/ES2012/070549
§ 371 (c)(1),
(2), (4) Date: Mar. 13, 2015

(87) PCT Pub. No.: WO2014/013094
PCT Pub. Date: Jan. 23, 2014

(65) Prior Publication Data
US 2015/0183266 A1   Jul. 2, 2015

(51) Int. Cl.
*B60B 7/20* (2006.01)
*B60Q 1/26* (2006.01)
*B60Q 1/32* (2006.01)

(52) U.S. Cl.
CPC ............. *B60B 7/20* (2013.01); *B60Q 1/2696* (2013.01); *B60Q 1/326* (2013.01); *B60B 2900/571* (2013.01); *B60B 2900/572* (2013.01); *B60Y 2200/10* (2013.01)

(58) Field of Classification Search
CPC ............... B60B 7/20; B60B 2900/571; B60B 2900/572; B60Q 1/326; B60Q 1/2696; B60Y 2200/10
USPC .............................. 301/37.25, 37.35, 37.108
See application file for complete search history.

(56) References Cited

U.S. PATENT DOCUMENTS

| 3,820,617 A * | 6/1974 | Groff .................... B60K 7/0007 180/10 |
| 2005/0116530 A1* | 6/2005 | Simpson .................... B60B 7/20 301/37.25 |
| 2005/0121968 A1* | 6/2005 | McCaster, III ........... B60B 7/20 301/37.25 |

(Continued)

FOREIGN PATENT DOCUMENTS

| WO | 2004062946 A1 | 7/2004 |
| WO | 2005065106 A2 | 7/2005 |
| WO | 2008066502 A2 | 6/2008 |

*Primary Examiner* — S. Joseph Morano
*Assistant Examiner* — Jean Charleston
(74) *Attorney, Agent, or Firm* — Hayes Soloway PC

(57) ABSTRACT

Device for maintaining the orientation of an emblem in an automobile wheel includes maintaining the emblem in a substantially vertical orientation. Maintaining the emblem in a substantially vertical orientation comprises a detection component for detecting the orientation of the emblem. The emblem also comprises a motor provided with an output shaft. The output shaft of the motor rotates integrally with the emblem such that the motor rotates the emblem to place it in a substantially vertical orientation depending on the orientation of the emblem detected by the detecting component.

11 Claims, 6 Drawing Sheets

(56) References Cited

U.S. PATENT DOCUMENTS

| | | | |
|---|---|---|---|
| 2006/0028059 A1* | 2/2006 | Choe | B60B 7/20 |
| | | | 301/108.1 |
| 2006/0038831 A1* | 2/2006 | Gilbert | B60K 35/00 |
| | | | 345/619 |
| 2007/0171664 A1* | 7/2007 | Shih | B60Q 1/326 |
| | | | 362/500 |
| 2009/0015057 A1 | 1/2009 | Groomes | |
| 2010/0097448 A1* | 4/2010 | Gilbert | B60K 35/00 |
| | | | 348/51 |
| 2010/0256946 A1* | 10/2010 | Carresjo | B60C 23/0462 |
| | | | 702/138 |
| 2011/0176322 A1* | 7/2011 | Lin | B60Q 1/326 |
| | | | 362/464 |
| 2012/0261978 A1* | 10/2012 | Lu | B62M 6/45 |
| | | | 301/6.5 |
| 2013/0088068 A1* | 4/2013 | Walser | B60K 7/0007 |
| | | | 301/6.5 |

\* cited by examiner

DEVICE FOR MAINTAINING THE ORIENTATION OF AN EMBLEM IN AN AUTOMOBILE WHEEL

The present invention relates to a device for maintaining the orientation of an emblem in an automobile wheel which allows the emblem to always be located in accordance with a predetermined orientation.

BACKGROUND OF THE INVENTION

Automobile wheels usually comprise an emblem in the central part bearing the automobile brand. This emblem usually rotates integrally in the rim of the wheel, such that its orientation will depend on the angular position of said rim.

As is evident, most of the time the emblem of the wheels will not be placed in a vertical orientation but rather in an inclined orientation, and the orientation of the emblem in one of the wheels will usually not coincide with the orientation of the emblems of the other wheels. Furthermore, when the automobile is moving, and depending on the speed of the vehicle, said emblem may not be seen due to its rotating speed.

To solve this emblem orientation problem in automobile wheels different devices allowing the emblem to remain substantially in a constant orientation are known.

Devices known today for maintaining the orientation of the emblem use mechanical means, primarily pendulums, for maintaining vertical orientation.

These mechanical devices have the drawback of not satisfactorily achieving their objective due to vehicle accelerations and decelerations. These accelerations and decelerations make the emblem noticeably swivel, because the mechanical systems for compensating the movement of the emblem do not allow maintaining the vertical orientation of the emblem quickly enough.

Document WO 2004/62946 A1 describes a device configured for maintaining a wheel emblem or axle in a fixed static position, wherein emblem movement can be controlled by means of fluid or magnetic mechanical friction elements, or even electronically controlled.

Despite the fact that it is indicated in this document that emblem movement can be controlled electronically, in no case does it describe any embodiment that includes said electronic control means or the possible advantages that may be obtained by means of using them.

The need for a device in which vertical orientation of the emblem can be controlled quickly enough so that in the case of automobile accelerations and decelerations its rotational movement is virtually unnoticeable is therefore evident.

DESCRIPTION OF THE INVENTION

The device of the invention solves the aforementioned drawbacks, presenting other advantages that will be described below.

The device for maintaining the orientation of an emblem in an automobile wheel comprises means for maintaining said emblem in a substantially vertical orientation and is characterized in that said means for maintaining said emblem in a substantially vertical orientation comprise:
  detection means for detecting the orientation of said emblem; and
  a motor provided with an output shaft, which output shaft of the motor rotates integrally with said emblem, such that said motor rotates said emblem to place it in its substantially vertical orientation depending on the orientation of the emblem detected by means of said detection means.

As a result of this feature, the orientation of the emblem in the case of automobile acceleration or deceleration is modified almost instantaneously, such that the emblem appears to be substantially fixed.

Advantageously, said motor is a direct current motor, such as a servomotor.

According to a preferred embodiment, said detection means for detecting the orientation of said emblem are two accelerometers, and said accelerometers are located with their measuring surfaces opposite one another.

Advantageously, said motor is fed by means of at least one battery, although said motor can also be fed, directly or through the battery, by means of an alternator linked to the automobile wheel, using the movement of the wheel.

If desired, the device of the present invention can also comprise a light-emitting diode or any light-emitting element to light up the emblem.

An ambient light-sensitive photodiode will provide a voltage level proportional to the light that is sensed. Depending on the level of light sensed and if it exceeds an established threshold, the light-emitting diode will be switched on or remain off.

Said motor also preferably comprises means for detecting the rotation of the shaft of the motor. These means allow knowing how much the emblem has rotated and it is thus determined when the motor is to be stopped when the emblem is placed in the desired orientation. Said detection means can be, for example, an encoder or a potentiometer.

According to a preferred embodiment, said alternator comprises a rotor which rotates integrally with the axle of the automobile wheel by means of a gear and a crown wheel.

To give the device further stability, said motor and said at least one battery are housed inside a casing, said at least one battery being placed below said motor.

BRIEF DESCRIPTION OF THE DRAWINGS

To better understand the foregoing, drawings are attached in which a practical embodiment is schematically depicted by way of non-limiting example.

DESCRIPTION OF A PREFERRED EMBODIMENT

Figure 1:
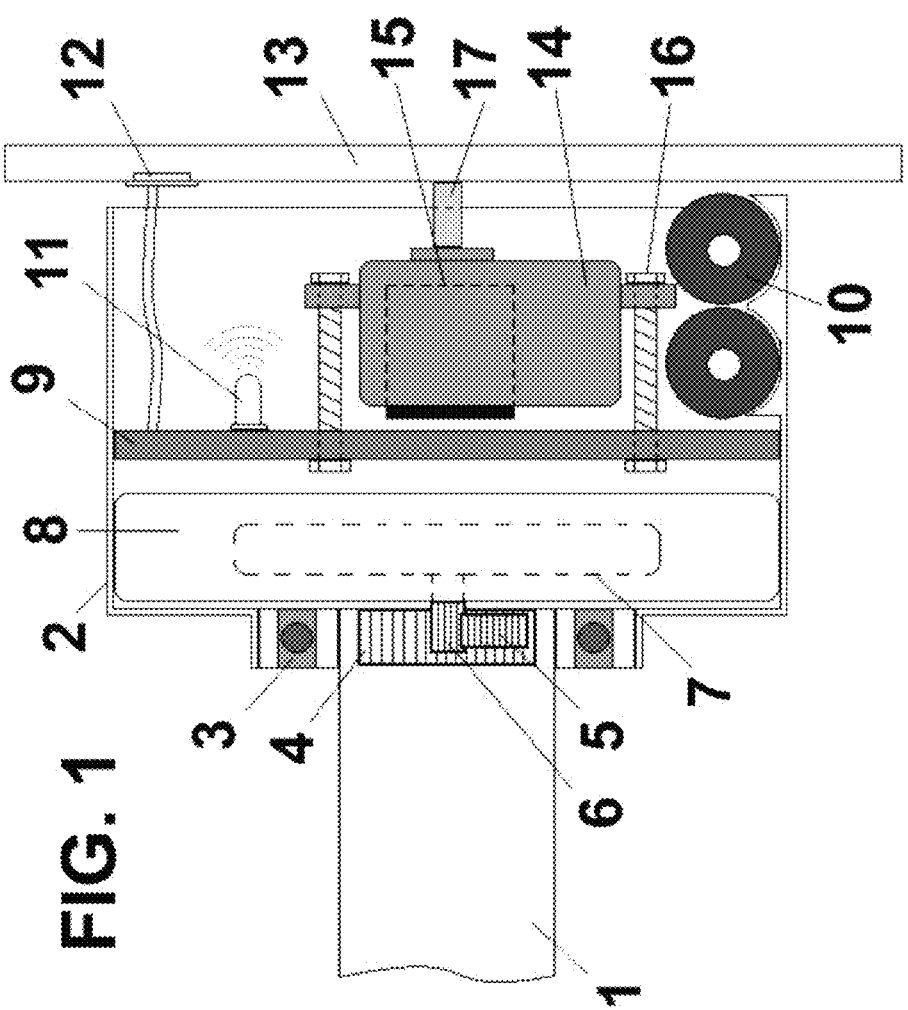
FIG. 1 is a schematic side view of the device of the present invention.
Figure 2:
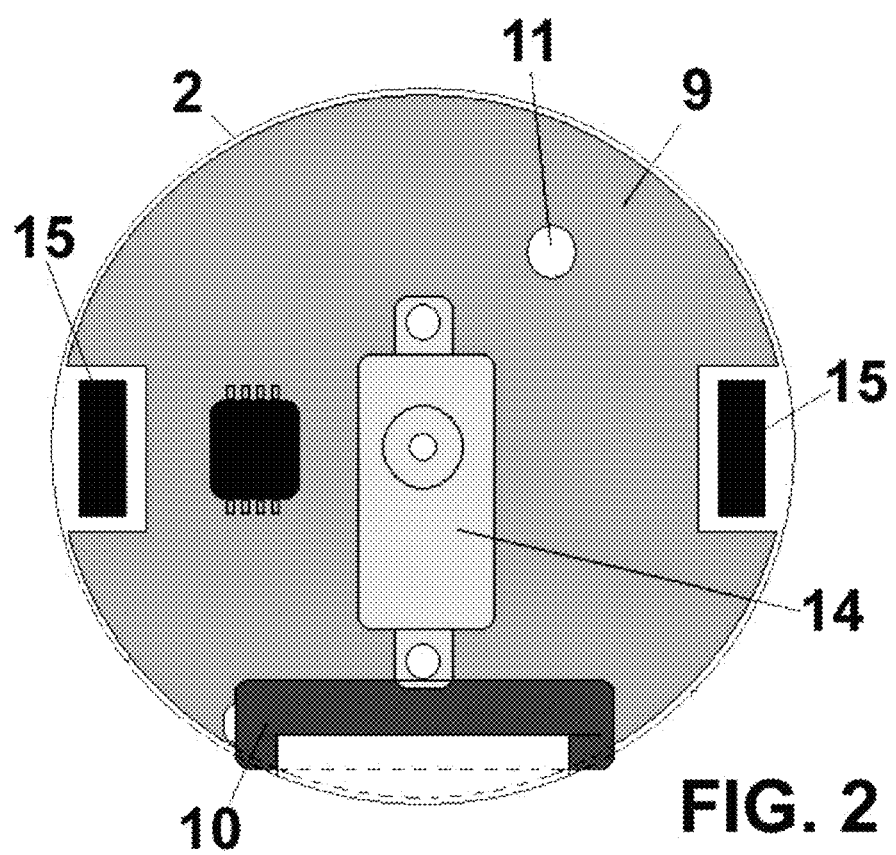
FIG. 2 is a schematic front view of the device of the present invention.

As can be seen in the drawings, the device for maintaining the orientation of an emblem in an automobile wheel comprises a casing 2 internally housing the components of the device of the present invention, providing them the necessary protection and fastening.

The emblem 13 placed in the front part (the front part in FIG. 1) rotates integrally with the output shaft 17 of a motor 14, such that the operation of the motor 14 will cause the rotation of said emblem 13 in one direction or the other.

Said motor 14, which is preferably a direct current motor, such as a servomotor, is associated with detection means for detecting the orientation of the emblem 13. In the depicted embodiment, said detection means are formed by two accelerometers 15 which are placed on the sides of said casing 2 such that their measuring surfaces are arranged opposite one another.

Said direct current motor 14 is fed by means of batteries 10. Said batteries 10 are advantageously placed below said motor 14, such that further stability is given to the device because its lower part will be heavier than its upper part.

Said motor 14 is also preferably fed by means of an alternator 8 which will provide power to the motor 14 (through the batteries 10 or directly) when the wheels of the automobile turn. This power can be provided by means of coupling the rotor 7 of the alternator and an axle 1 rotating integrally with the automobile wheel where the device of the present invention is installed. The shaft 6 of said rotor 7 particularly meshes with a gear 5, which in turn meshes with an outer crown wheel 4 located in said axle 1.

As can be seen in FIG. 1, said axle 1 is fixed to said casing 2 by means of bearings 3 which allow decoupling the movement of the axle 1 from the casing 2, or vice versa.

The device of the present invention can also comprise a light source 11 to light up the emblem 13. A light-emitting diode (LED) 11 in particular is used to light up the emblem 13 when the lighting conditions are below a predetermined level. For this purpose, said light-emitting diode 11 is connected to a photodiode 12 detecting the ambient light.

The device of the present invention also comprises a printed circuit board 9 to which the motor 14 is fixed by means of screws 16.

The device of the present invention works as follows:

The motor 14 is responsible for rotating the emblem 13 to the position in which the observer can always see it correctly, i.e., to its vertical orientation. The motor 14 will thus be operated to rotate the emblem 13, counteracting the movements caused by automobile accelerations and decelerations or by the actual movement of the wheels.

Accordingly, to be able to counteract said movements first it is necessary to know how much the emblem 13 has shifted, i.e., how many degrees it has rotated. This information is obtained from the accelerometers 15, whereby measuring the angle between the current orientation of the emblem 13 and the vertical orientation.

Accelerometers 15 in particular provide information about the value of the angle rotated and the direction in which said rotation has occurred.

Figure 3:
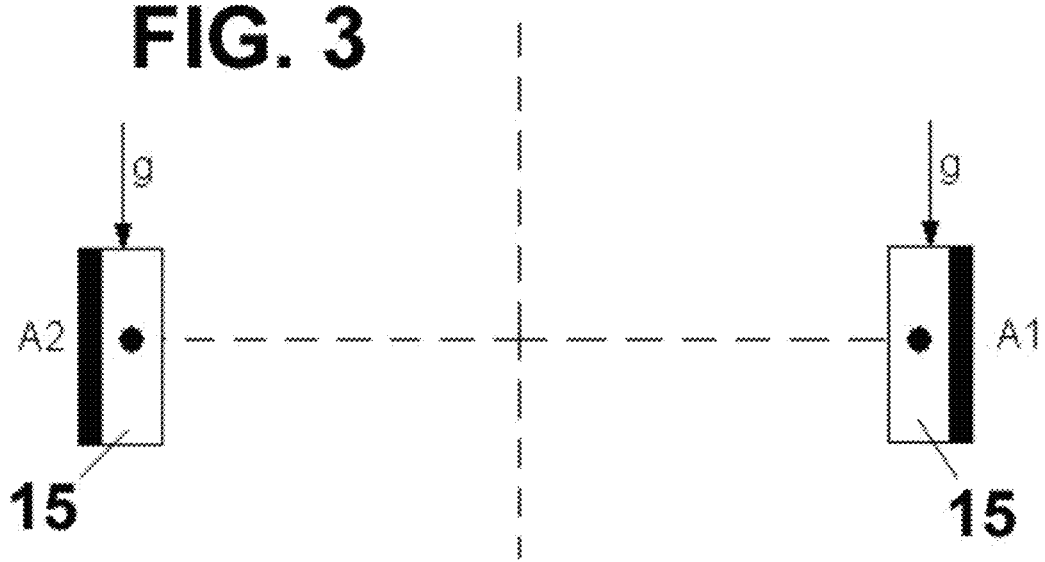
FIG. 3 is a schematic view of the accelerometers of the device of the present invention in the idle state.

When the automobile is stopped (FIG. 3), the accelerometers will have gravity on one of their side surfaces that will be perpendicular to the acceleration measuring surface. Therefore, the accelerometers will have an output equal to 0 g because they cannot record the value of gravity.

Figure 4:
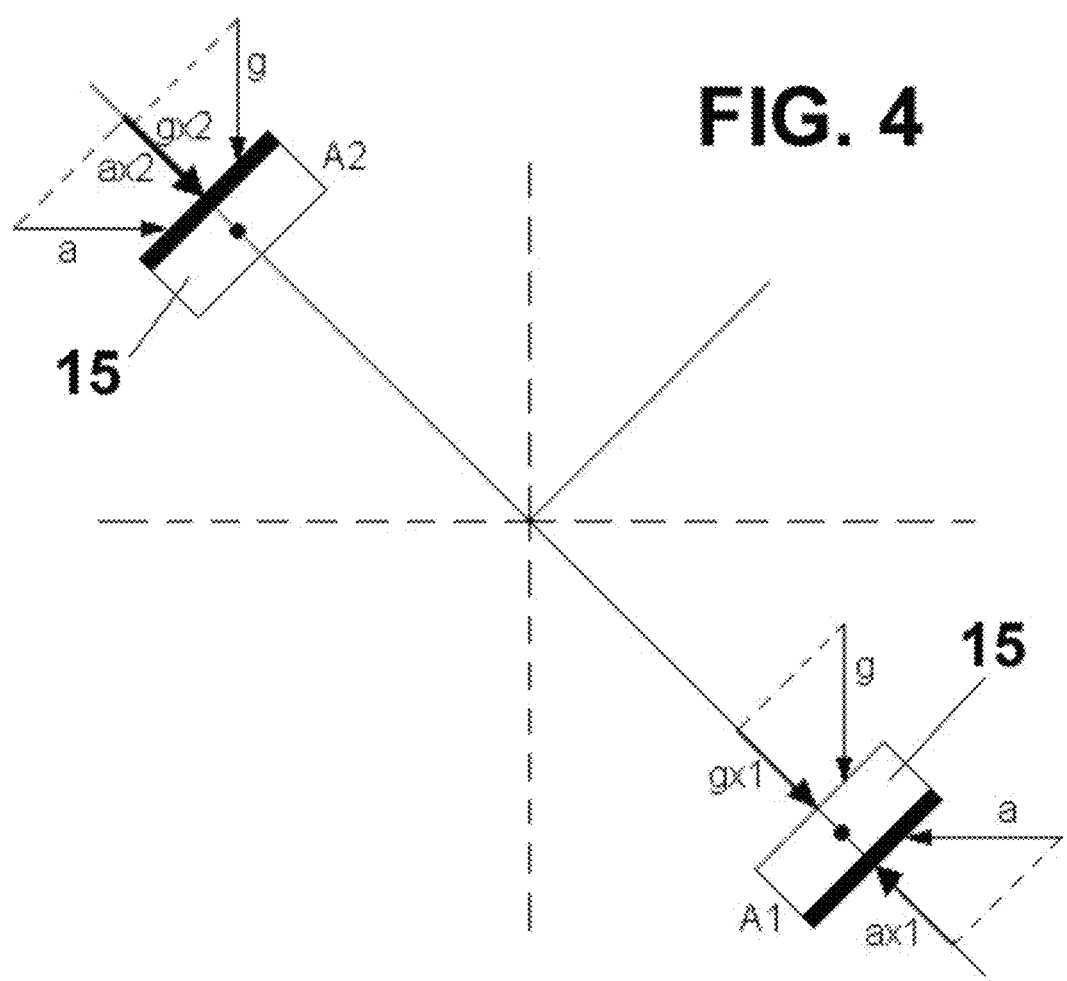
FIG. 4 is a schematic view of the accelerometers of the device of the present invention during automobile acceleration.

FIG. 4 shows the influence of the acceleration and gravity vectors on the accelerometers in the event that the automobile moves forward with certain acceleration.

It can be seen in FIG. 4 that the value of gravity in the accelerometers is the same but with an opposing sign. The value of acceleration in the two accelerometers will be the same and have the same sign. This is because the acceleration experienced by one of the accelerometers will be the same in the other but in the opposite direction.

Therefore, it can be said that the result of the accelerometers will be determined by the following expression:

First accelerometer: $A1 = a_{x1} - g_{x1}$

Second accelerometer: $A2 = a_{xe} + g_{x2}$

The component of gravity measured by the accelerometers is to be calculated. For that purpose the following is calculated:

$$\left| \frac{A1 - A2}{2} \right| = \left| \frac{a_{x1} - g_{x1} - (a_{x2} + g_{x2})}{2} \right| = \left| \frac{-2g_x}{2} \right| = |-g_x| = g_x$$

Now, with the values of gravity and the component thereof on the accelerometers (FIG. 5), the degrees that the emblem has rotated can be easily calculated:

$\theta = \arccos(g_x/g)$

Figure 5:
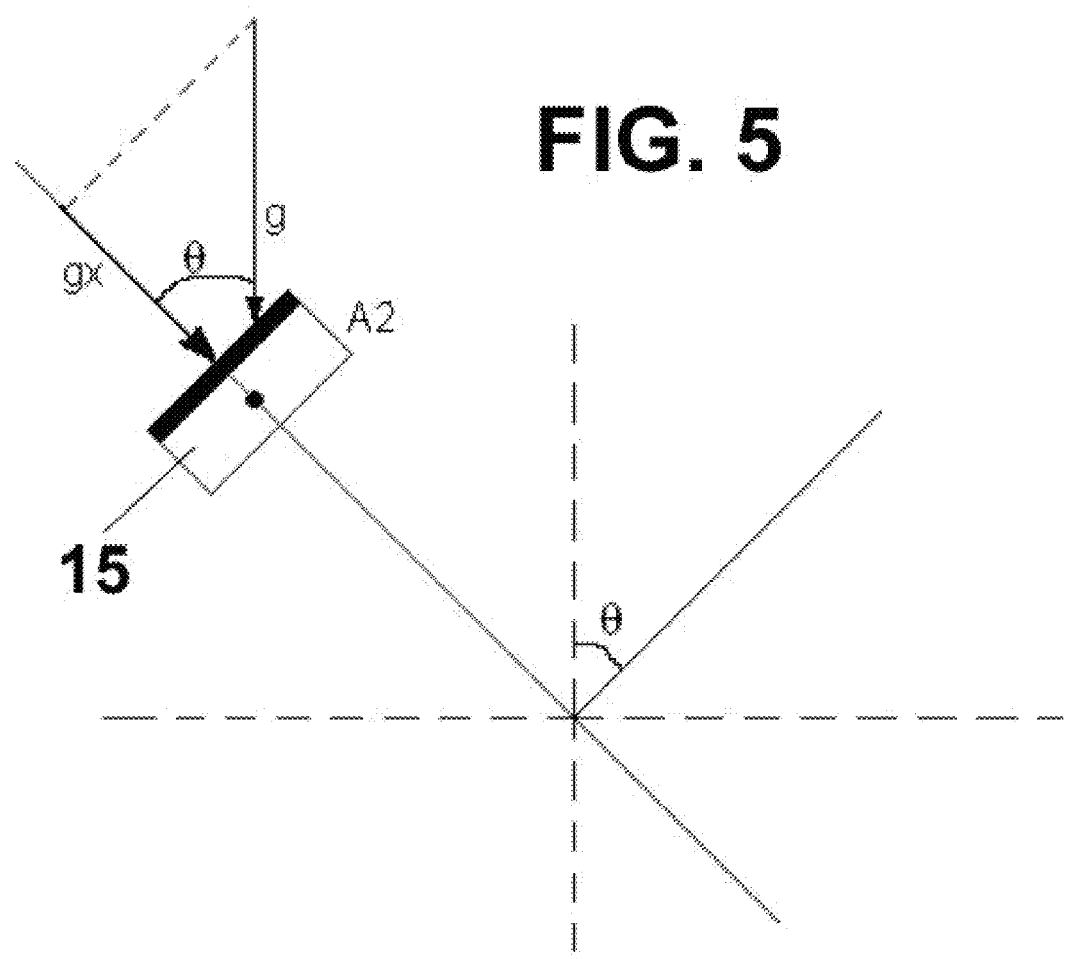
FIG. 5 is a schematic view of one of the accelerometers, showing the angle rotated θ.
Figure 6:
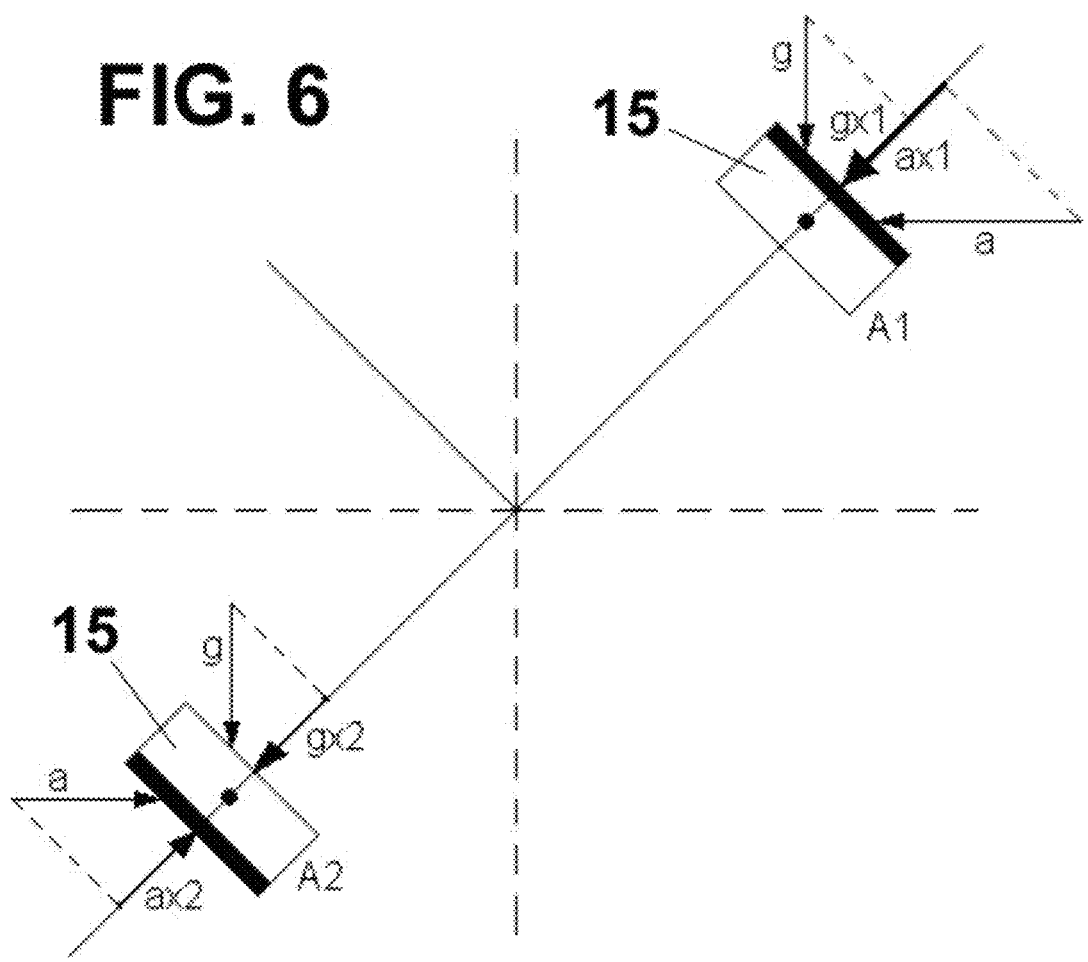
FIG. 6 is a schematic view of the accelerometers of the device of the present invention during automobile braking.

FIG. 5 shows the case in which the car is going backwards or experiences negative acceleration (braking).

In this case the equations of the accelerometers would be as follows:

First accelerometer: $A1 = a_{x1} + g_{x1}$

Second accelerometer 2: $A2 = a_{xe} - g_{x2}$

By observing the equations of the accelerometers in both cases, the direction in which the emblem has rotated can be deduced, and the opposite direction for correcting it can therefore be chosen.

Table depicting the rotational direction with respect to the value of the accelerometers:

| Car movement | Equations | Condition | Rotational direction for correction |
|---|---|---|---|
| Forwards | $A1 = a_{x1} - g_{x1}$<br>$A2 = a_{x2} + g_{x2}$ | $|A1| < |A2|$ | Left |
| Backwards or braking | $A1 = a_{x1} + g_{x1}$<br>$A2 = a_{x2} - g_{x2}$ | $|A1| > |A2|$ | Right |

The motor 14 will be operated based on this information of the angle where the emblem 13 is located in order to return it to its original position maintaining verticality thereof. This information is collected through a data acquisition card and will be the reference signal of a closed-loop control system.

A controller will be responsible for operating the motor 14 proportionally to the angle rotated by the emblem 13, modifying the working signal of the PWM (Pulse Width Modulation) signal controlling the motor.

To be able to activate or deactivate the motor and choose the direction which it must be rotated, an L6203 integrated circuit, for example, is used, said circuit mainly consisting of CMOS transistors forming an H bridge configuration. The digital lines controlling this integrated circuit are connected thereto by means of the aforementioned data acquisition card.

It must also be indicated that the motor 14 is associated with an encoder providing a digital signal, for example at a rate of 1000 rising edges per turn given by the motor. It can thus be known how much the emblem 13 has rotated and whether the controller must stop the motor 14 because the emblem 13 is in the desired vertical orientation.

The device of the present invention is controlled by means of suitable software, whereby controlling the data acquisition card.

As previously indicated, the light source 11 is preferably, for example, a white LED source, so that the colors belonging to the emblem stand out and no additional color is given off, as may occur if diodes of other colors are used.

The LED 11 will only be activated when the outdoor lighting conditions are insufficient: at night, at dawn or dusk, in tunnels, car parks, etc.

As previously indicated, a light-sensitive photodiode 12 providing a voltage level proportional to the light that is sensed is used to know the amount of ambient light. The LED 11 will or will not be switched on depending on the level of light that is sensed (voltage level).

In the lighting circuit there will be a reference signal for establishing the on level of the LED 11, i.e., the level of outdoor darkness from which the emblem 13 will be lighted up will be established.

Although any type of suitable battery can be used, according to a preferred embodiment the device of the present invention will be fed by means of rechargeable Ni-MH batteries. To help these batteries to not be used up too quickly, said alternator has been arranged, using the rotation of the automobile wheel to feed the circuits and charge the batteries when the automobile speed is high enough and more current can be generated.

Despite having made reference to a specific embodiment of the invention, it is obvious for a person skilled in the art that the described device is susceptible to a number of variations and modifications, and that all the mentioned details can be replaced with others that are technically equivalent without departing from the scope of protection defined by the attached claims.

The invention claimed is:

1. A device for maintaining the orientation of an emblem in an automobile wheel, comprising means for maintaining said emblem in a substantially vertical orientation, characterized in that said means for maintaining said emblem in a substantially vertical orientation comprise:

detection means for detecting the orientation of said emblem, the detection means comprising two accelerometers, whereby the two accelerometers provide different data; and a motor provided with an output shaft, which output shaft of the motor rotates integrally with said emblem, such that said motor rotates said emblem to place it in its substantially vertical orientation depending on the orientation of the emblem detected by means of said detection means.

2. The device for maintaining the orientation of an emblem in an automobile wheel according to claim 1, wherein said motor is a servomotor.

3. The device for maintaining the orientation of an emblem in an automobile wheel according to claim 1, wherein said two accelerometers are located with their measuring surfaces opposite one another.

4. The device for maintaining the orientation of an emblem in an automobile wheel according to claim 1, wherein said motor is fed by means of at least one battery.

5. The device for maintaining the orientation of an emblem in an automobile wheel according to claim 4, wherein said motor is also fed by means of an alternator linked to the automobile wheel.

6. The device for maintaining the orientation of an emblem in an automobile wheel according to claim 5, wherein said alternator comprises a rotor which rotates integrally with the axle of the automobile wheel by means of a gear and a crown wheel.

7. The device for maintaining the orientation of an emblem in an automobile wheel according to claim 4, wherein said motor and said at least one battery are housed inside a casing, said at least one battery being placed below said motor.

8. The device for maintaining the orientation of an emblem in an automobile wheel according to claim 1, also comprising a light-emitting diode to light up the emblem.

9. The device for maintaining the orientation of an emblem in an automobile wheel according to claim 8, wherein said light-emitting diode is connected to a light-sensitive photodiode.

10. The device for maintaining the orientation of an emblem in an automobile wheel according to claim 1, wherein said motor comprises detection means for detecting the rotation of the output shaft of the motor.

11. The device for maintaining the orientation of an emblem in an automobile wheel according to claim 10, wherein said detection means for detecting the rotation of the output shaft of the motor comprise an encoder or a potentiometer.

* * * * *